Oct. 6, 1942.  G. H. READING  2,298,069
TREE SUPPORT
Filed July 1, 1941
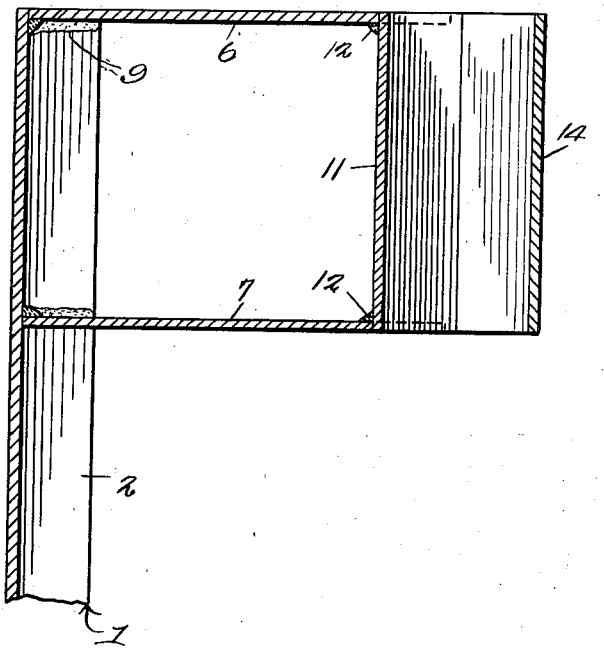
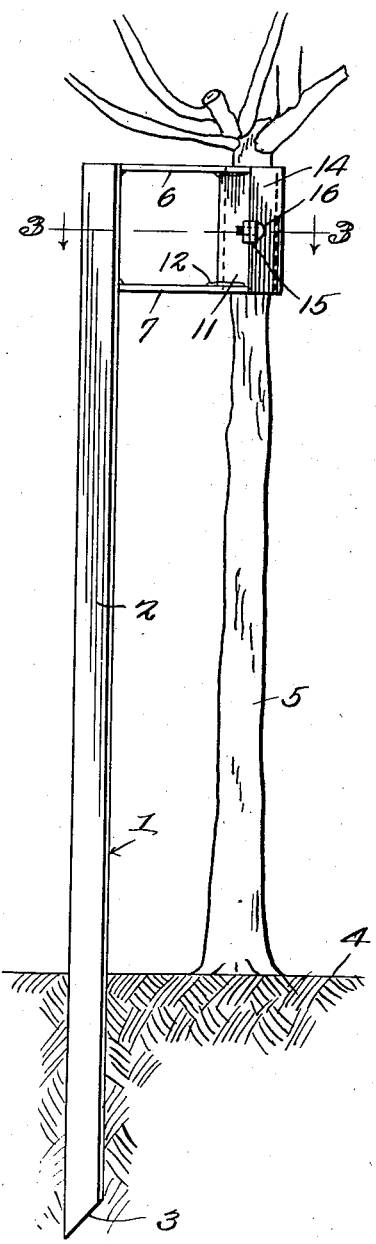
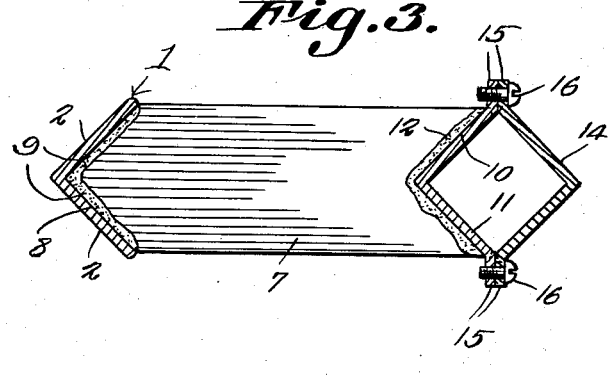
G. H. Reading
INVENTOR.
BY Knowles Patented Oct. 6, 1942

2,298,069

UNITED STATES PATENT OFFICE 2,298,069

TREE SUPPORT

George H. Reading, Vallejo, Calif.

Application July 1, 1941, Serial No. 400,667

2 Claims. (Cl. 47—43)

This invention aims to provide a simple device for supporting a tree, bush or the like, the device being so constructed that it may be made cheaply out of standard metal parts and be offered to the public at small cost. The invention aims, further, to provide a novel construction whereby a stake can be driven into the ground readily, without damage to the stake, or to the tool by which the driving is done. The invention aims, further, to supply a device of the class described which will withstand hard use.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in side elevation, a device constructed in accordance with the invention;

Fig. 2 is a longitudinal section;

Fig. 3 is a cross section on the line 3—3 of Fig. 1.

In carrying out the invention, all parts, preferably, are made of metal, the drawing showing a stake 1, which is an angle member, having flanges 2 disposed at right angles to each other, the stake being pointed as shown at 3, in order that it may the more readily be driven into the ground 4, wherein is growing a piece of vegetation, such as a tree or bush 5.

An upper horizontal arm 6 and a lower horizontal arm 7 are provided, and, preferably, are flat strips of metal, pointed at their inner ends, as shown at 8, to fit closely between the flanges 2 of the stake 1, the arms being held securely to the stake, by welding or the like, indicated by the reference character 9. In their outer ends, the arms 6 and 7 are provided with notches 10, receiving a fixed jaw 11, the cross section of which is the same as the cross section of the stake 2. The fixed jaw 11 is held in the notches 10 by welding 12 or equivalent means.

The end surfaces of the jaw 11 are flush with the upper surface of the arm 6 and with the lower surface of the arm 7, respectively. Moreover, the upper surface of the arm 6 is flush with the upper end of the stake 1. Consequently, an adequate hammering surface is provided, for use in the driving of the stake 1. The upper end of the stake 1 will not cut to pieces the beetle or other tool by which the driving is done, and since the pointed part 8 of the upper arm 6 is securely mounted by the welding 9 in the angle of the stake 1, the said arm will not be distorted by driving blows.

The numeral 14 marks a removable jaw, of the same height as the fixed jaw 11. The cross section of the removable jaw 7 is the same as the cross section of the fixed jaw 11, and since the parts 11 and 14 have a common cross section with the stake 1, it is unnecessary to provide several different kinds of angle stock in the making of the device. The jaws 14 and 11 have cooperating outstanding ears 15, receiving securing devices 16, such as screws or bolts, which hold the jaw 14 assembled detachably with the jaw 11, the tree or bush 5 extending upwardly between the jaws. Preferably, the tree or bush 5 is wrapped with soft material, where it passes between the jaws 11 and 14, there being no disclosure of the wrapping in the drawing, since the use of it is a matter of horticultural practice.

The article shown is simple in construction but will be found thoroughly advantageous for the ends in view.

What is claimed is:

1. In a support for growing vegetation, an angle member stake embodying flanges, a transverse arm having a pointed portion secured in the angle defined by the flanges, the upper end surface of the stake being exposed, to receive the impact of a driving tool; the upper surface of the pointed portion of the arm being flush with the upper end surface of the stake, and the arm being practically as wide as the stake, to prevent a driving tool from being damaged by contact with the stake; and means assembled with the arm for supporting growing vegetation.

2. In a device for supporting growing vegetation, an angle member stake, flat transverse upper and lower arms terminally assembled with the stake on the open side thereof, oppositely facing fixed and movable angle member jaws, the cross section of the jaws being the same as the cross section of the stake, means for securing the fixed jaw to the arms, and means for releasably connecting the movable jaw to the fixed jaw.

GEORGE H. READING.